(12) United States Patent
Yun et al.

(10) Patent No.: US 9,091,410 B2
(45) Date of Patent: Jul. 28, 2015

(54) BACKLIGHT UNIT AND DISPLAY USING THE SAME

(71) Applicant: LG INNOTEK CO., LTD., Seoul (KR)

(72) Inventors: Duk Hyun Yun, Seoul (KR); Se Jin Ko, Seoul (KR); Sang Hyeok Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/288,172

(22) Filed: May 27, 2014

(65) Prior Publication Data

US 2014/0268659 A1 Sep. 18, 2014

Related U.S. Application Data

(63) Continuation of application No. 13/413,876, filed on Mar. 7, 2012, now Pat. No. 8,764,268.

(30) Foreign Application Priority Data

Oct. 25, 2011 (KR) ........................ 10-2011-0109464

(51) Int. Cl.
*F21V 7/00* (2006.01)
*G02F 1/1335* (2006.01)
*F21V 8/00* (2006.01)

(52) U.S. Cl.
CPC ............ *F21V 7/0066* (2013.01); *G02B 6/0031* (2013.01); *G02B 6/0096* (2013.01); *G02F 1/133605* (2013.01); *G02F 1/133615* (2013.01); *G02F 1/133609* (2013.01)

(58) Field of Classification Search
CPC ............ F21V 7/0066; G02F 1/133605; G02F 1/133609; G02F 1/133615; G02B 6/0031; G02B 6/0096
USPC ........ 362/298, 300, 346, 97.1, 615, 617, 618, 362/619, 623–625, 628
See application file for complete search history.

(56) References Cited

U.S. PATENT DOCUMENTS

| | | |
|---|---|---|
| 2005/0018147 A1 | 1/2005 | Lee et al. ........................ 353/98 |
| 2007/0171626 A1* | 7/2007 | Chang ............................. 362/97 |
| 2007/0171676 A1 | 7/2007 | Chang ........................... 362/613 |
| 2011/0211335 A1 | 9/2011 | Ko ................................ 362/97.1 |
| 2011/0222267 A1 | 9/2011 | Park et al. .................... 267/97.1 |

FOREIGN PATENT DOCUMENTS

| | | |
|---|---|---|
| CN | 102171505 A | 8/2011 |
| EP | 2 549 308 A2 | 1/2013 |

(Continued)

OTHER PUBLICATIONS

Chinese Office Action dated Aug. 19, 2014 issued in Application No. 201210099933.1 (with English translation).

(Continued)

*Primary Examiner* — Thomas M Sember
(74) *Attorney, Agent, or Firm* — KED & Associates LLP

(57) ABSTRACT

Disclosed are a backlight unit and a display using the same. The backlight unit includes a first reflector, a second reflector, and at least one light source disposed between the first reflector and the second reflector, and the end of the second reflector is separated from the at least one light source by a first distance in the upward direction of the at least one light source.

17 Claims, 16 Drawing Sheets

(56) References Cited

FOREIGN PATENT DOCUMENTS

| | | |
|---|---|---|
| JP | 2005-129409 A | 5/2005 |
| JP | 2006-106212 A | 4/2006 |
| JP | 2006-202729 A | 8/2006 |
| JP | 2009-117042 A | 5/2009 |
| JP | 2010-157445 A | 7/2010 |
| WO | WO 2011/050254 A1 | 4/2011 |

OTHER PUBLICATIONS

European Search Report dated Feb. 26, 2013 issued in Application No. 12 15 8906.

Japanese Office Action dated May 9, 2013 issued in Application No. 2012-057737.

United States Office Action dated Sep. 24, 2013 issued in U.S. Appl. No. 13/413,876.

* cited by examiner

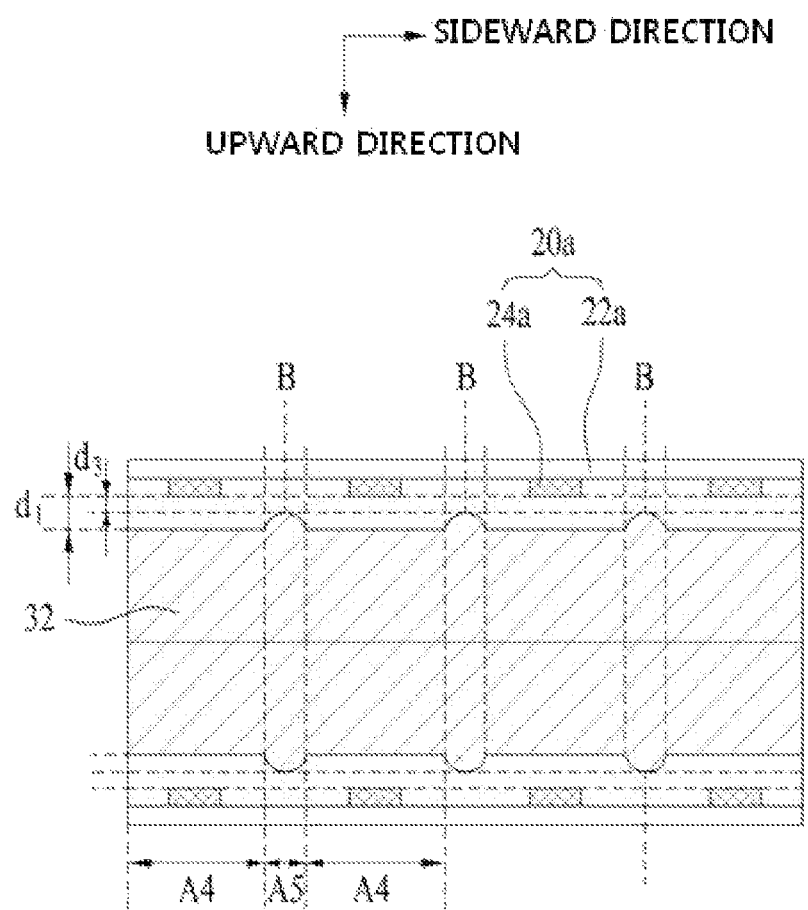

BACKLIGHT UNIT AND DISPLAY USING THE SAME

CROSS-REFERENCE TO RELATED APPLICATION(S)

The present application is a Continuation of co-pending U.S. patent application Ser. No. 13/413,876 filed Mar. 7, 2012, which claims priority under 35 U.S.C. §119 to Korean Patent Application No. 10-2011-0109464 filed in Korea on Oct. 25, 2011 which is hereby incorporated in its entirety.

TECHNICAL FIELD

Embodiments relate to a backlight unit and a display using the same.

BACKGROUND

In general, as a representative large-scale display, a liquid crystal display (LCD) or a plasma display panel (PDP) is used.

Differently from the PDP of a self-emitting type, the LCD essentially requires a separate backlight unit due to absence of self-emitting light emitting devices.

Backlight units used in LCDs are classified into an edge type backlight unit and a direct type backlight unit according to positions of light sources. In the edge type backlight unit, light sources are disposed on left and right side surfaces and/or upper and lower side surfaces of an LCD panel and a light guide plate is used to uniformly distribute light throughout the overall surface of the LCD panel, and thus uniformity of light is improved and the panel has an ultra-thin thickness.

In the direct type backlight unit which is generally used in displays having a size of 20 inches or more, a plurality of light sources is disposed under a panel. Thus, the direct type backlight unit has excellent optical efficiency, as compared to the edge type backlight unit, thereby being mainly used in large-scale displays requiring high brightness.

As light sources of the conventional edge type or direct type backlight unit, cold cathode fluorescent lamps (CCFLs) are used. However, a backlight unit using CCFLs may consume a considerable amount of power because power is applied to the CCFLs at all times, exhibit a color reproduction rate of about 70% that of a CRT, and cause environmental pollution due to addition of mercury.

In order to solve these problems, research into a backlight unit using light emitting diodes (LEDs) has been conducted. If LEDs are used as the backlight unit, an LED array may be partially turned on/off and thus power consumption may be considerably reduced. Particularly, RGB (red, green and blue) LEDs exceed 100% of national television system committee (NTSC) color reproduction range specifications, thus providing a more vivid image to consumers.

Further, LEDs fabricated using a semiconductor process are harmless to the environment.

SUMMARY

Embodiments provide a backlight unit which may reduce a yellow-white component of light emitted from a light source, and a display using the same.

In one embodiment, a backlight unit includes a first reflector, a second reflector, and at least one light source disposed between the first reflector and the second reflector, wherein the end of the second reflector is separated from the at least one light source by a first distance in the upward direction of the at least one light source.

The first distance may be expressed by Equation below, $$d_1 = x_1 \tan \theta_1,$$

here, d1 may represent the first distance, x1 may represent a separation distance between the at least one light source and the end of the second reflector in the sideward direction of the at least one light source, and θ1 may be an angle of inclination of the upper surface of the second reflector in the sideward direction of the at least one light source. The angle of inclination of the upper surface of the second reflector may be 5° to 15°, and the first distance may be 0.1 mm to 1.2 mm The backlight unit may further include a support part supporting the second reflector, and the end of the support part in the direction toward the at least one light source may be inclined.

The first reflector may include a surface protruding in the sideward direction of the at least one light source. The protruding surface may have at least one shape from among a hemispherical shape, a triangular shape, a rectangular shape and a polygonal shape.

The end of the first reflector may be separated from the at least one light source by a second distance in the upward direction of the at least one light source. The first distance and the second distance may be different or equal. Otherwise, the first distance may be greater or smaller than the second distance.

The second distance may be expressed by Equation below, $$d_2 = x_2 \tan \theta_2,$$

here, d2 may represent the second distance, x2 may represent a separation distance between the at least one light source and the upper surface of the first reflector in the sideward direction of the at least one light source, and θ2 may be an angle of inclination of the upper surface of the first reflector in the sideward direction of the at least one light source. The angle of inclination of the upper surface of the first reflector may be 5° to 15°.

The end of the second reflector may be separated from the at least one light source by a third distance smaller than the first distance in the upward direction of the at least one light source in a peripheral area between light sources. The third distance may be '0'.

The first distance between the end of the second reflector and the at least one light source in the upward direction of the at least one light source may be varied with increasing distance from the at least one light source in the sideward direction of the at least one light source.

For example, the first distance may be gradually decreased with increasing distance from the at least one light source in the sideward direction of the at least one light source.

The second reflector may include a specular reflection area and a scattered reflection area, and the first distance may be located around the specular reflection area.

The first distance may be located in an area overlapping the first reflector.

A backlight unit, comprising: a first reflector; a second reflector; and at least one light source disposed between the first reflector and the second reflector, wherein the end of the second reflector is not contact with the at least one light source, wherein an air guide may be defined in a space between the second reflector and a optical member.

BRIEF DESCRIPTION OF THE DRAWINGS

Arrangements and embodiments may be described in detail with reference to the following drawings in which like reference numerals refer to like elements and wherein:

FIG. 5A to 5E are plan views of 2 edge-type backlight units illustrating various shapes of a second reflector in accordance with embodiments;

DESCRIPTION OF SPECIFIC EMBODIMENTS

Figure 1:
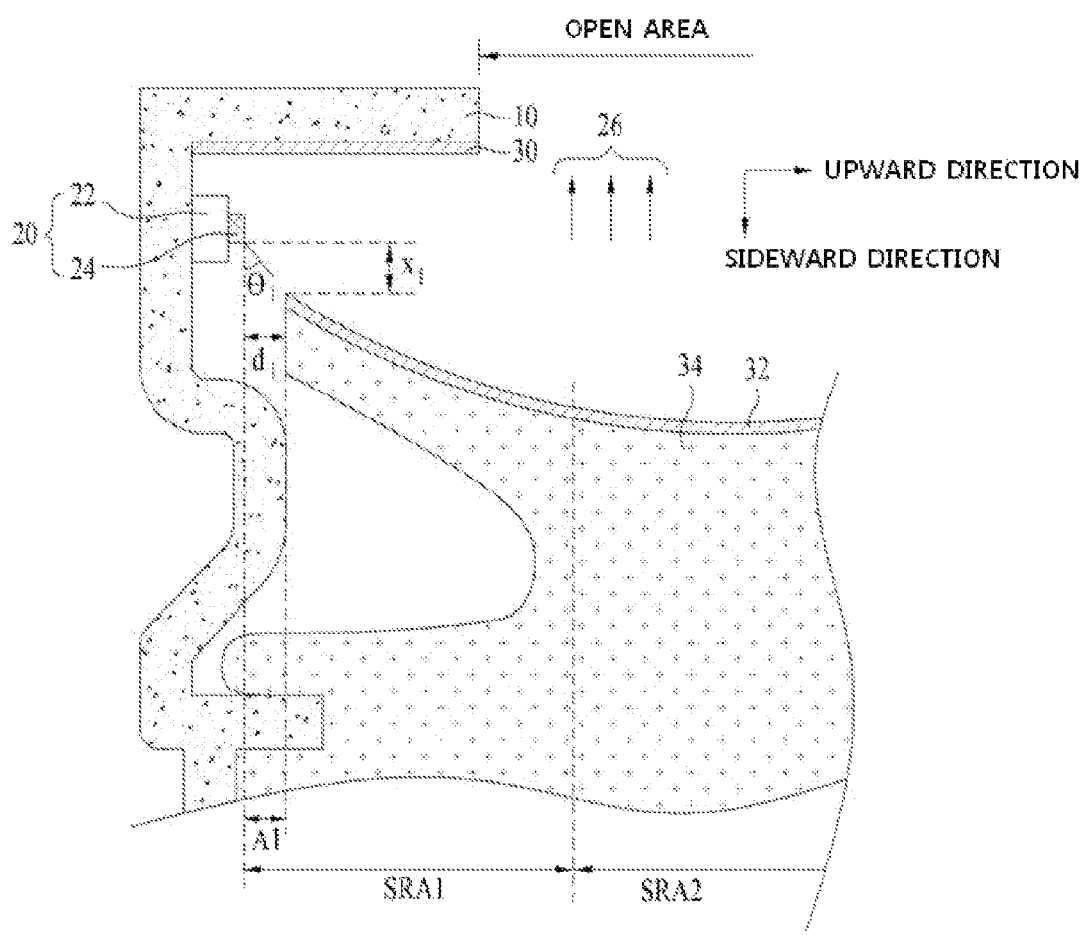
FIG. 1 is a cross-sectional view of a backlight unit in accordance with one embodiment.

Hereinafter, embodiments will be described with reference to the annexed drawings.

It will be understood that when an element is referred to as being "on" or "under" another element, it can be directly on/under the element, and one or more intervening elements may also be present. Further, when an element is referred to as being "on" or "under", "under the element" as well as "on the element" can be included based on the element.

In the drawings, the thicknesses or sizes of respective layers are exaggerated, omitted, or schematically illustrated for convenience and clarity of description. Further, the sizes of the respective elements do not denote the actual sizes thereof.

FIG. 1 is a cross-sectional view of a backlight unit in accordance with one embodiment.

With reference to FIG. 1, the backlight unit includes a cover plate (or a heat bar) 10, a light source module 20 including at least one light source 24, a first reflector 30, a second reflector 32, and a support part (or a bottom cover or a bottom chassis) 34.

The cover plate 10 may support or fix the light source module 20. Although not shown in the drawings, the cover plate 10 may include a plurality of protruding heat-dissipation lines to dissipate heat generated from the light source module 20. Further, the first reflector 30 is attached to the cover plate 10.

The support part 34 may be referred to as a bottom molding part to support the second reflector 32, and may be formed of a polymeric resin, such as plastic, so as to be produced through injection molding.

The support part 34 includes at least two inclined surfaces having at least one inflection point, and the curvatures of the first and second inclined surfaces connected to the inflection point may be equal or different.

The second reflector 32 attached to the upper surface of the support part 34 may have the same shape as the support part 34. That is, the second reflector 32 includes at least two inclined surfaces having at least one inflection point, and the curvatures of the first and second inclined surfaces connected to the inflection point may be different.

The light source module 20 including the at least one light source 24 is disposed between the first reflector 30 and the second reflector 32, and may contact or be separated from one side of the first reflector 30 by a designated interval. For example, the light source module 20 may be separated from the first reflector 30 by a designated interval, as shown in FIG. 1.

Further, the light source module 20 may include a circuit board 22 having an electrode pattern, and the at least one light source (or at least one light emitting device) 24 generating light. Here, the at least one light source 24 may be mounted on the circuit board 22, and the electrode pattern to connect the at least one light emitting device 24 to an adapter supplying power may be disposed on the circuit board 22.

For example, a carbon nano tube electrode pattern to connect the at least one light emitting device 24 to the adapter may be disposed on the upper surface of the circuit board 22.

Such a circuit board 22 may be a printed circuit board (PCB) which is formed of one selected from the group consisting of polyethylene terephthalate (PET), glass, polycarbonate (PC) and silicon (Si) and on which plural light sources 24 are mounted, or be formed as a film.

Further, the circuit board 22 may selectively employ a single layer PCB, a multi-layer PCB, a ceramic substrate, a metal core PCB, etc.

The light emitting device used as the light source 24 may be an LED chip, and the LED chip may be a blue LED chip or an ultraviolet LED chip, or a package in which at least one of a red LED chip, a green LED chip, a blue LED chip, a yellow-green LED chip or a white LED chip are combined.

In accordance with the embodiment, a white LED may be used as the light source 24.

The white LED may be produced by combining a yellow phosphor with a blue LED, by using both a red phosphor and a green phosphor on a blue LED, or by together using a yellow phosphor, a red phosphor and a green phosphor on a blue LED.

The light source 24 shown in FIG. 1 may be divided into a horizontal type, a vertical type or a hybrid type according to structures thereof.

The first reflector 30 and the second reflector 32 may be separated from each other by a designated interval and be opposite to each other so that an air guide is provided between a vacant space between the first reflector 30 and the second reflector 32.

The first reflector 30 may be formed of one of a reflective coating film and a reflective coating material layer, and may serve to reflect light generated from the light source module 20 to the second reflector 32.

The first and second reflectors 30 and 32 may be formed of a metal or a metal oxide exhibiting high reflectivity, such as aluminum (Al), silver (Ag), gold (Au) or titanium oxide (TiO2). The first and second reflectors 30 and 32 may be formed of the same material or different materials, and the surface roughnesses of the first and second reflectors 30 and 32 may be different.

The second reflector 32 may be formed through deposition or coating of a metal or a metal oxide on a polymeric resin frame serving as the support part 34, or through printing of a metal ink on the polymeric resin frame. Here, deposition may employ a thermal evaporation method, an evaporation method or a vacuum evaporation method such as sputtering, and coating or printing may employ a printing method, a gravure coating method or a silk screen method.

Further, a saw-toothed reflective pattern may be formed on a portion of the surface of the first reflector 30 opposite to the light source module 20, and the surface of the saw-toothed reflective pattern may be flat or curved. The reason why the reflective pattern is formed on the surface of the first reflector 30 is to reflect light generated from the light source module 20 to the central area of the second reflector 32 to increase brightness of the central area of the backlight unit.

In accordance with the embodiment, the end of the second reflector 32 is separated from the at least one light source 24 by a first distance d1. That is, the end of the second reflector 32 is separated from the at least one light source 24 by the first distance d1 in the upward direction of the at least one light source 24 under the condition that a gap is provided between the end of the second reflector 32 and the at least one light source 24. The end of the second reflector 32 is not contact with the at least one light source 24.

Further, the first distance d1 may be located in an area overlapping the first reflector 30.

The gap is located at a first area A1 where a yellow-white component of light generated and emitted from the light source 24 is concentrated. Therefore, the yellow-white component of light emitted from the light source 24 may leak through the gap. Here, leakage of the yellow-white component means that the yellow-white component is not reflected toward the second reflector 32.

Since the end of the second reflector 32 is separated from the at least one light source 24 by the first distance d1 in the upward direction under the condition that the gap through which the yellow-white component of light generated from the light source 24 may leak is provided therebetween, as described above, yellowing of light 26 emitted from the backlight unit through an open area may be reduced.

In accordance with this embodiment, the first distance d1 may be expressed by Equation 1 below.

$$d_1 = x_1 \tan \theta_1$$ [Equation 1]

Here, x1 represents a separation distance between the at least one light source 24 and the end of the second reflector 32 in the sideward direction of the at least one light source 24, and θ1 is an angle of inclination of the upper surface of the second reflector 32 in the sideward direction of the at least one light source 24. That is, 90−θ1 means an angle of inclination of the second reflector 32 from a horizontal plane in parallel with the surface of the first reflector 30.

Although FIG. 1 illustrates an angle between the sideward direction and the upward direction as a right angle, this embodiment is not limited thereto. That is, the angle between the sideward direction and the upward direction may be an obtuse angle or an acute angle.

Further, the inclined surfaces of the second reflector 32 may serve to reflect light generated from the light source module 20 or light reflected by the first reflector 30 to the opened area of the first reflector 30.

Figure 2:
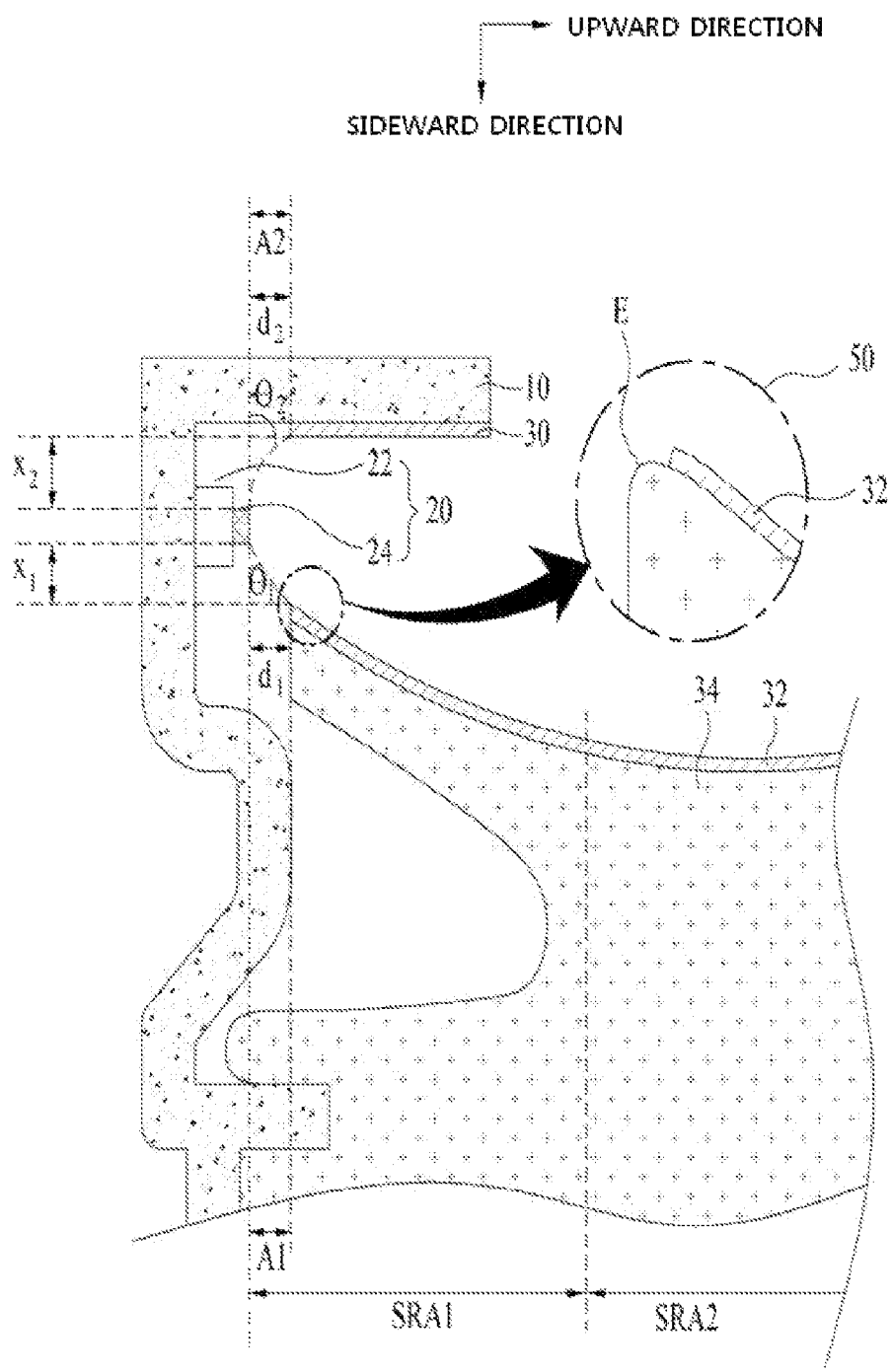
FIG. 2 is a cross-sectional view of a backlight unit in accordance with another embodiment.

In accordance with the embodiment, the first distance d1 may be 0.1 mm to 1.2 mm For example, the first distance d1 may be 0.3 mm FIG. 2 is a cross-sectional view of a backlight unit in accordance with another embodiment.

As shown in FIG. 2, the end of a first reflector 30 is separated from the at least one light source 24 by a second distance d2. That is, the end of the first reflector 30 is separated from the at least one light source 24 by the second distance d2 in the upward direction of the at least one light source 24 under the condition that a second area A2 is provided therebetween. Here, a yellow-white component of light generated from the at least one light source 24 is concentrated at the second area A2, in the same manner as the first area A1. Except for the above description, the backlight unit shown in FIG. 2 has the same configuration as the backlight unit shown in FIG. 1.

In accordance with this embodiment, the first distance d1 may be equal to or different from the second distance d2. For example, the first distance d1 may be greater or smaller than the second distance d2. Further, the second distance d2 may be expressed by Equation 2 below.

$$d_2 = x_2 \tan \theta_2$$ [Equation 2]

Here, x2 represents a separation distance between the at least one light source 24 and the upper surface of the first reflector 30 in the sideward direction of the at least one light source 24, and θ2 is an angle of inclination of the upper surface of the first reflector 30 in the sideward direction of the at least one light source 24.

In Equation 1 and Equation 2 above, each of θ1 and θ2 may be an angle of light emitted from the at least one light source 24, i.e., 5*~15°. For example, each of θ1 and θ2 may be 10°.

If the light source module 20 does not contact the first reflector 30 and is separated from the first reflector 30 by a designated interval, the first reflector 30 is separated from the at least one light source 24 by the second distance d2 in the upward direction, as shown in FIG. 2, thereby further reducing yellowing of light 26 emitted from the backlight unit.

However, if the circuit board 22 of the light source module 20 contacts the first reflector 30, the at least one light source 24 contacts the first reflector 30, or the light source module 20 is disposed close to the first reflector 30, the first reflector 30 may not be separated from the at least one light source 24 by the second distance d2, as shown in FIG. 1. That is, the first reflector 30 may be formed in the same manner as FIG. 1.

Here, as shown in a partially enlarged view 50 of FIG. 2, the end E of the second reflector 32 may be rounded.

Figure 3:
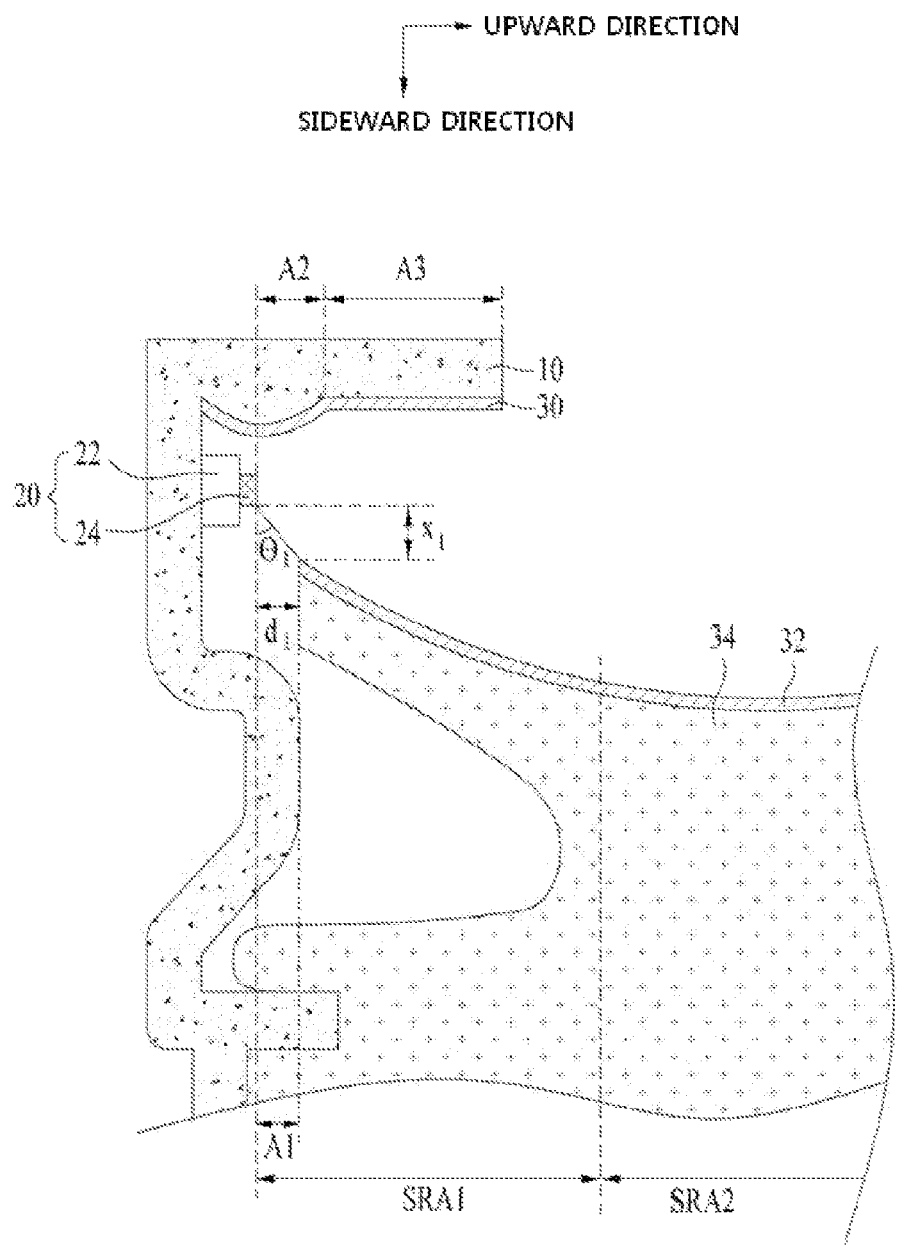
FIG. 3 is a cross-sectional view of a backlight unit in accordance with still another embodiment.

FIG. 3 is a cross-sectional view of a backlight unit in accordance with still another embodiment.

As shown in FIG. 3, a first reflector 30 may have a surface protruding in the sideward direction of at least one light source 24. For example, the first reflector 30 may have the protruding surface in a second area A2 where a yellow-white component of light emitted from the at least one light source 24 is concentrated. The protruding surface of the first reflector 30 may have at least one shape from among a hemispherical shape, a triangular shape, a rectangular shape and a polygonal shape. For example, the protruding surface of the first reflector 30 may have a hemispherical shape, as shown in FIG. 3.

If the light source module 20 does not contact the first reflector 30 but is separated from the first reflector 30 by a designated interval, the first reflector 30 has the protruding surface, as shown in FIG. 3, thereby further reducing yellowing of light 26 emitted from the backlight unit.

However, if the light source module 20 contacts the first reflector 30 and the at least one light source 24 is disposed close to the first reflector 30, the first reflector 30 may not have the protruding surface, as shown in FIG. 1.

Figure 4:
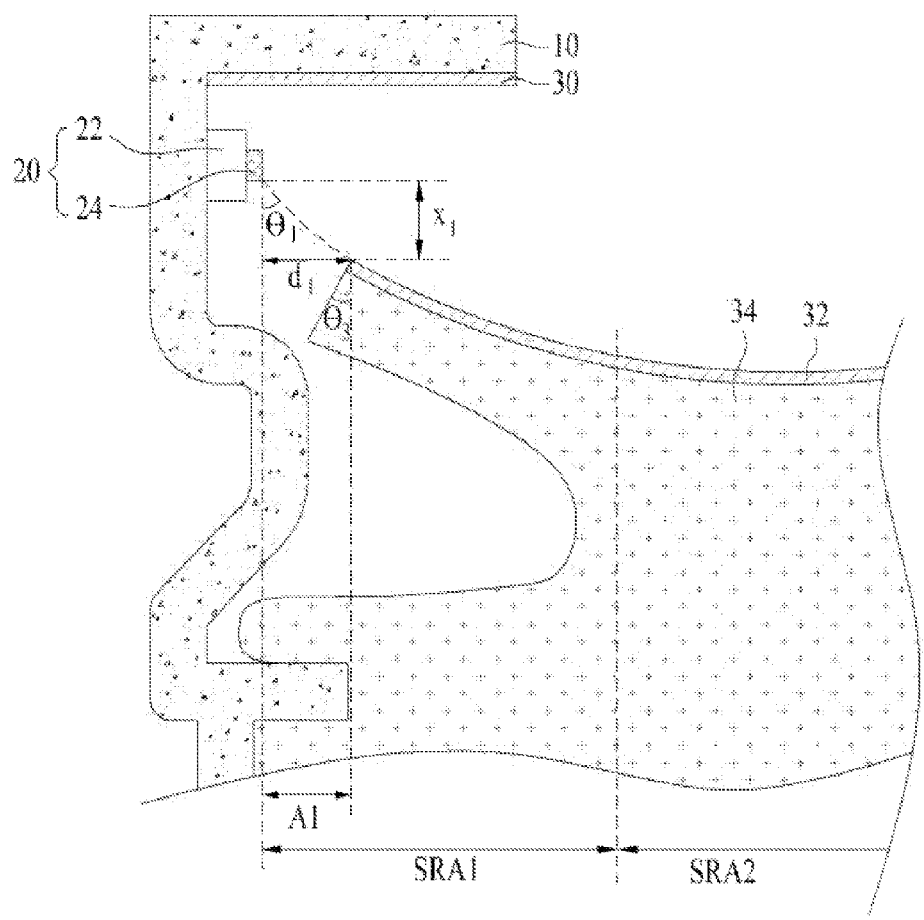
FIG. 4 is a cross-sectional view of a backlight unit in accordance with still another embodiment.

FIG. 4 is a cross-sectional view of a backlight unit in accordance with still another embodiment.

As shown in FIG. 4, the end of a support part 34 supporting a second reflector 32 in the upward direction of at least one light source 24 may be inclined at an angle θ3. Because the end of the support part 34 is inclined at the angle θ3, as described above, a yellow-white component of light emitted from the light source 24 may leak more effectively through a gap.

In each of the backlight units shown in FIGS. 1 to 4, the second reflector 32 includes a specular reflection area SRA1 and a scattered reflection area SRA2.

Here, the specular reflection area SRA1 serves to execute specular reflection of incident light, and the scattered reflection area SRA2 serves to execute scattered reflection of incident light. For this purpose, a specular reflection sheet may be disposed in the specular reflection area SRA1 of the second reflector 32, and a scattered reflection sheet may be disposed in the scattered reflection area SRA2 of the second reflector 32. The reflectivity of the specular reflection area SRA1 and the scattered reflection area SRA2 may be about 50 to 99.99%. Further, the specular reflection area SRA1 may occupy about 5 to 50% of the whole area of the second reflector 32. According to circumstance, the specular reflection area SRA1 may occupy about 20 to 30% of the whole area of the second reflector 32. Further, in the whole area of the second reflector 32, an area ratio of the specular reflection area SRA1 to the scattered reflection area SRA2 may be 1:1~20.

In accordance with one embodiment, in each of the backlight units shown in FIGS. 1 to 4, the first distance d1 may be formed around the specular reflection area SRA1. For example, the first area A1 in which the gap is formed may be located in the specular reflection area SRA1 and/or around the specular reflection area SRA1 of the second reflector 32.

FIG. 5A to 5E are plan views of 2 edge-type backlight units illustrating various shapes of the second reflector 32 in accordance with embodiments.

Figure 5A:
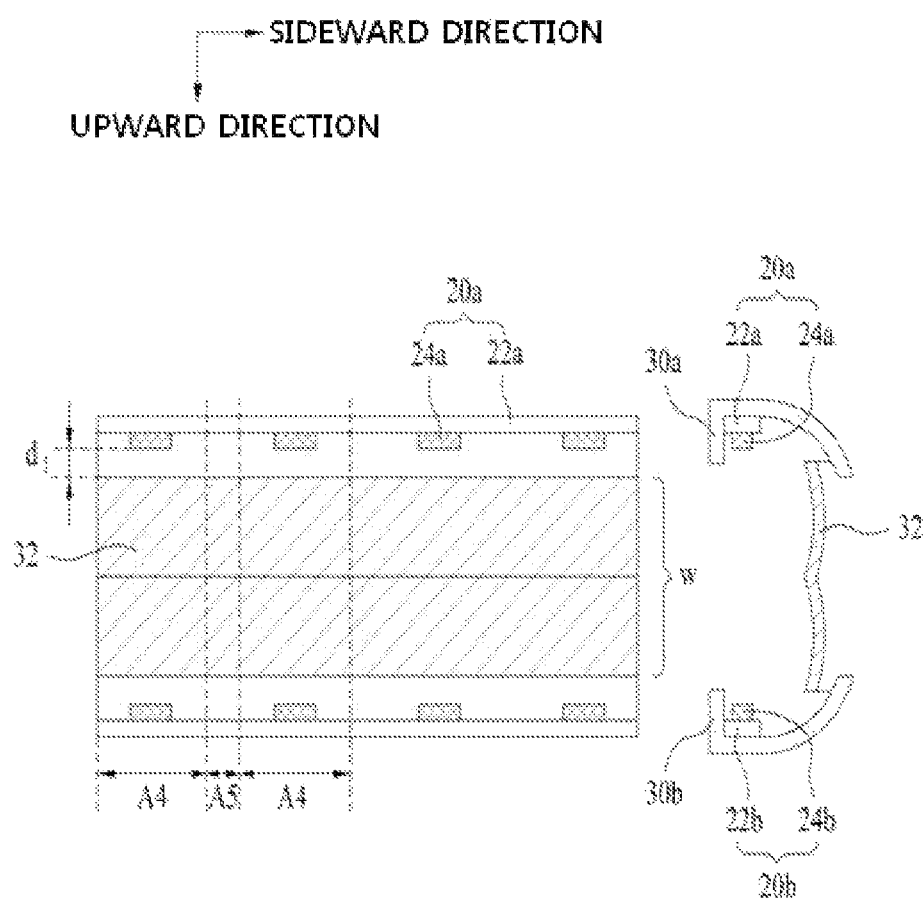

As shown in FIG. 5A, a first reflector 30a and 30b and a second reflector 32 may be separated from each other in the sideward direction of light sources 24a and 24b so as to be opposite to each other. Further, a light source module 20a including a circuit board 22a and the light sources 24a may be disposed between the first and second reflectors 30a and 32, and a light source module 20b including a circuit board 22b and the light sources 24b may be disposed between the first and second reflectors 30b and 32.

As shown in FIG. 5A, the second reflector 32 may have a regular width w throughout areas (hereinafter, central areas) A4 which may reflect light emitted from the light sources 24 in a short distance and areas (hereinafter, peripheral areas) A5 between the light sources 24, regardless of the central areas A4 and the peripheral areas A5.

Further, the end of the second reflector 32 is separated from the light sources 24 by a first distance d1 in the upward direction of the light sources 24 in the central area A4. However, the end of the second reflector 32 may be separated from the light sources 24 by a third distance d3 in the upward direction of the light sources 24 in the peripheral area A5. If the third distance d3 is '0', the second reflector 32 may have a shape shown in FIG. 5B or 5D. On the other hand, if the third distance d3 is not '0', the second reflector 32 may have a shape shown in FIG. 5C or 5E. In accordance with the embodiment, the third distance d3 is smaller than the first distance d1.

If the amount of the yellow-white component of light emitted from the light sources 24 in the central area A4 is greater than that in the peripheral area A5, maximal increase of the area of the second reflector 32 is required to increase brightness of the backlight unit while reducing yellowing. For this reason, the width of the second reflector 32 in the peripheral area A5 is increased, as shown in FIG. 5B or 5C, rather than uniformizing the width w of the second reflector 32, as shown in FIG. 5A.

For this purpose, in accordance with another embodiment, the first distance d1 which is an interval between the end of the second reflector 32 and the light sources 24 in the upward direction may be varied with increasing distance from the ends of the light sources 24a and 24b in the sideward direction of the light sources 24a and 24b. For example, as shown in FIG. 5D or 5E, the interval between the end of the second reflector 32 and the light sources 24a and 24b in the upward direction may be gradually decreased, as the second reflector 32 approaches a boundary B in the peripheral area A5. That is, the first distance d1 may be decreased.

Figure 5B:
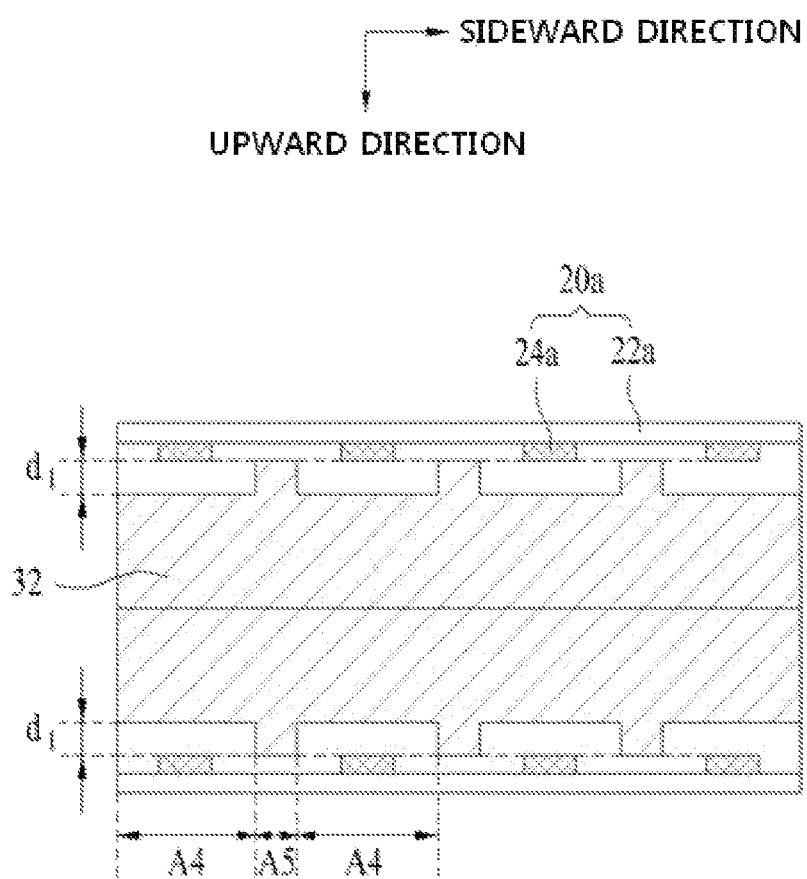
Figure 5C:
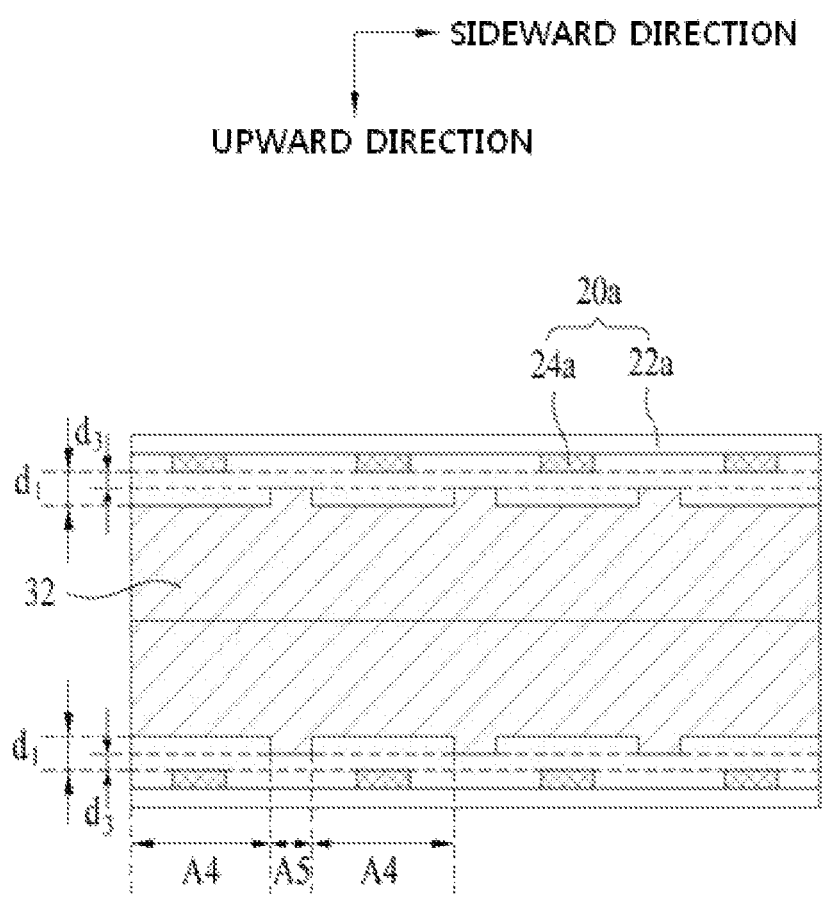
Figure 5D:
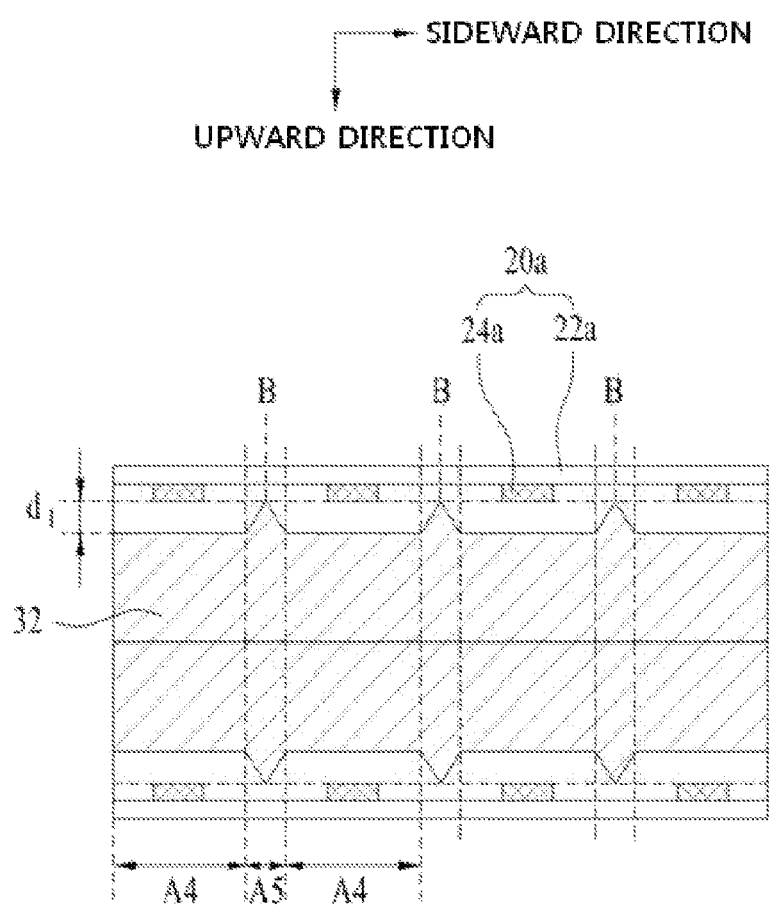

If the yellow-white component is gradually reduced with increasing distance from the light sources 24 in the peripheral area A5, the case in which the first distance d1 is gradually decreased with increasing distance from the light sources 24 in the peripheral area A5, as shown in FIG. 5D or 5E, may further reduce yellowing than the case in which the width of the second reflector 32 in the peripheral area A5 is uniform, as shown in FIG. 5B or 5C.

Figure 6:
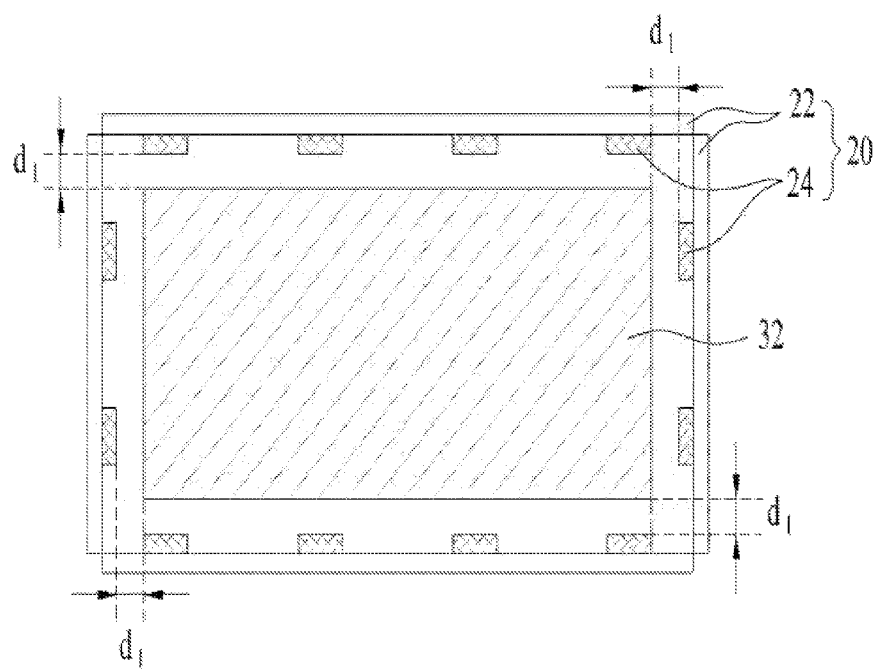
FIG. 6 is a plan view of a 4 edge-type backlight unit illustrating a shape of a second reflector in accordance with another embodiment.

FIG. 6 is a plan view of a 4 edge-type backlight unit illustrating a shape of the second reflector 32 in accordance with another embodiment.

In the case of the 4 edge-type backlight unit shown in FIG. 6, light source modules 20 are respectively disposed at 4 side surfaces, i.e., left, right, upper and lower edges of the backlight unit, and the end of the second reflector 32 is separated from light sources 24 of each side surface by a first distance d1 in the upward direction of the light sources 24.

Although not shown in the drawings, the 4 edge-type backlight unit may have various shapes of the second reflector 32 in the peripheral area A5 in the same manner as the 2 edge-type backlight units shown in FIGS. 5B to 5E.

For example, the second reflector 32 may be separated from the light sources 24 by the first distance d1 in the upward direction only in the central area A4, and may be separated from the light sources 24 by another distance in the upward direction in the peripheral area A5. That is, the end of the second reflector 32 may be separated from the light sources 24 by a third distance d3 in the upward direction in the peripheral area A5, or the second reflector 32 may be implemented such that the first distance d1 is gradually decreased with increasing distance from the light sources 24.

Figure 7:
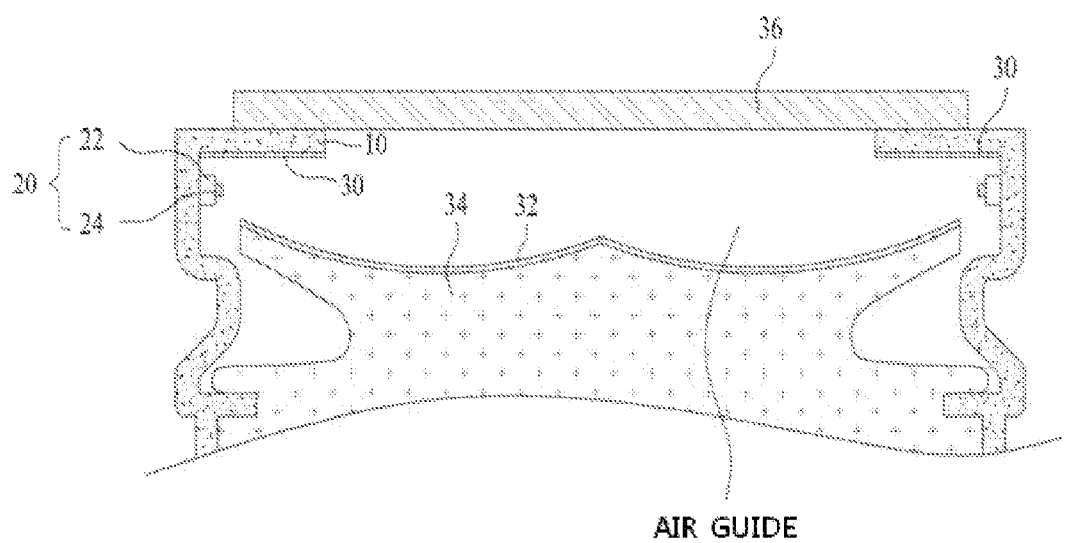
FIG. 7 is a view illustrating a backlight unit including optical members in accordance with another embodiment.

FIG. 7 is a view illustrating a backlight unit including optical members in accordance with another embodiment.

The backlight unit in accordance with this embodiment may further include optical member 36 separated from the second reflector 32 by a designated interval, and an air guide is formed in a space between the second reflector 32 and the optical member 36.

As shown in FIG. 7, the optical member 36 is disposed in an open area of the first reflector 30. Here, the optical member 36 serves to diffuse light emitted through the open area of the first reflector 30, and may include at least one sheet, i.e., may selectively include a diffusion sheet, a prism sheet, a brightness enhancement sheet, etc. Here, the diffusion sheet serves to diffuse light emitted by the light sources 24, the prism sheet serves to guide diffused light to a light emission area, and the brightness enhancement sheet serves to enhance brightness.

As described above, the backlight unit separates the end of the second reflector 32 from the light sources 24 by the first distance d1, thereby allowing the yellow-white component of light to leak through a gap therebetween and reducing yellowing.

The light source module 20 may have a direct emitting type structure in which the light emitting surface of the light source module 20 is disposed in the direction toward the air guide between the optical member 36 and the second reflector 32. Otherwise, the light source module 20 may have an indirect emitting type structure in which the light emitting surface of the light source module 20 is disposed in the direction of one of the first reflector 30, the second reflector 32 and the cover plate 10. Here, in the case of the indirect emitting type light source module 20, light emitted from the light source module 20 may be reflected by the first reflector 30, the second reflector 32 and the cover plate 10, and then the reflected light may travel in the direction toward the air guide of the backlight unit. The reason why the indirect emitting type light source module 20 is provided is to reduce hot spots.

Figure 8:
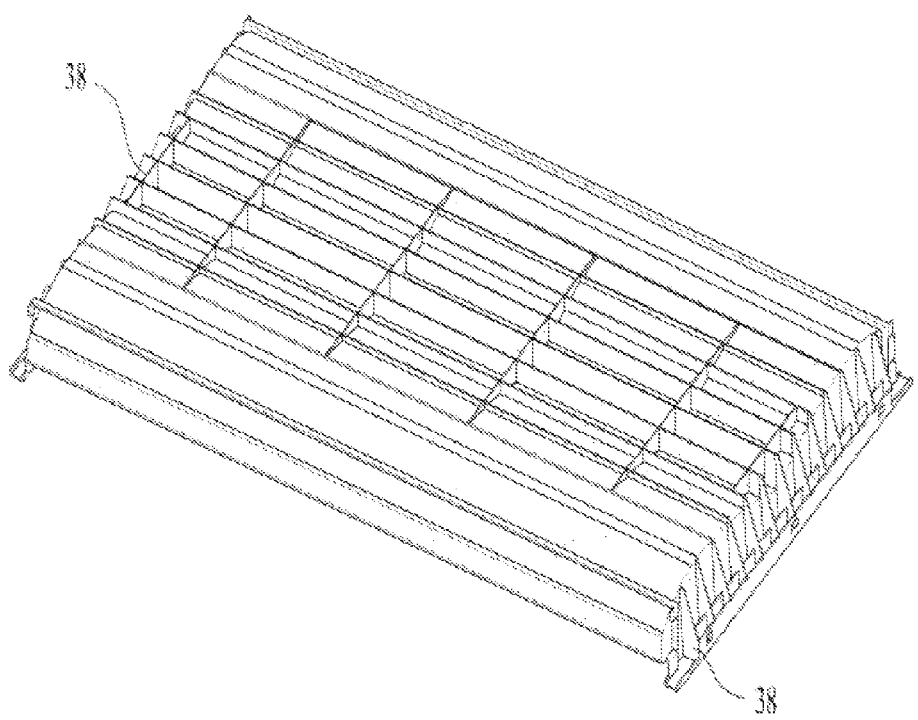
FIG. 8 is a view illustrating reinforcing ribs disposed on the lower surface of a support part.

FIG. 8 is a view illustrating reinforcing ribs disposed on the lower surface of the support part 34.

As shown in FIG. 8, plural reinforcing ribs 38 may be disposed on the rear surface of the support part 34.

The reason for this is to prevent deformation of the curved reflective surface of the support part 34 due to external environmental conditions.

The reinforcing ribs 38 may be disposed on portions of the rear surface of the support part 34 opposite to the side surfaces of the support part 34 as well as on the portions of the rear surface of the support part 34 opposite to the inclined surfaces of the support part 34.

Figure 9:
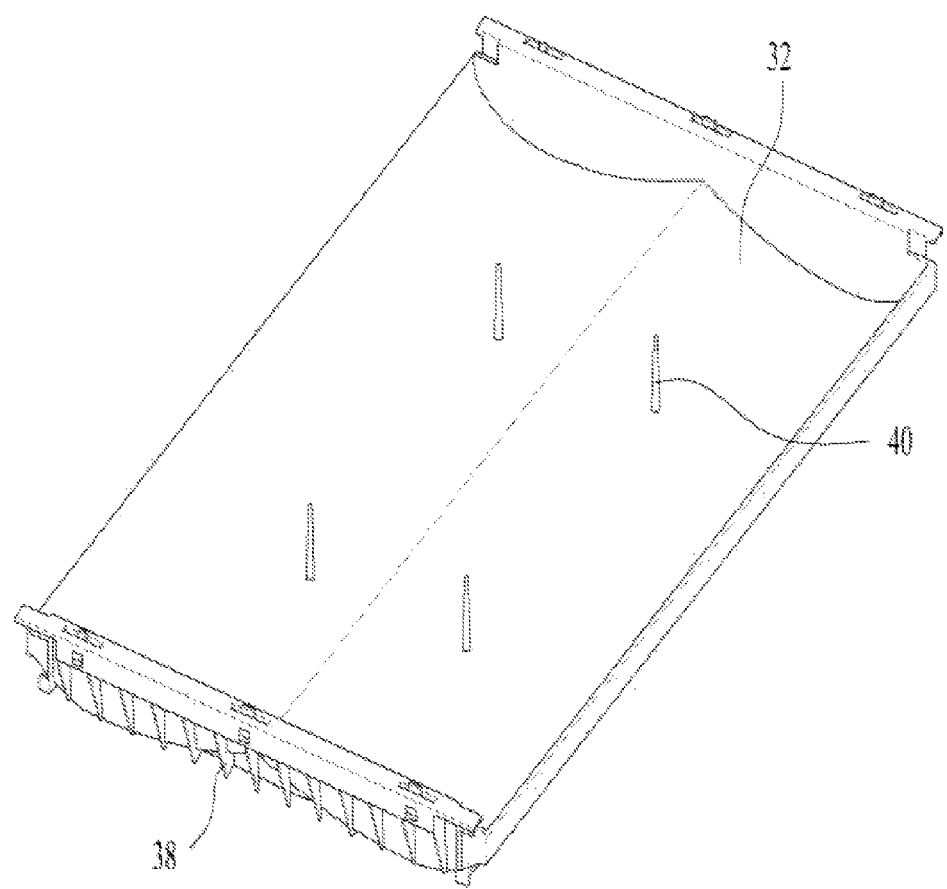
FIG. 9 is a view illustrating support pins disposed on the upper surface of the second reflector.

FIG. 9 is a view illustrating support pins disposed on the upper surface of the second reflector 32.

As shown in FIG. 9, support pins 40 supporting the optical member 36 may be disposed on the upper surface of the second reflector 32. Because the optical member 36 is separated from the second reflector 32 and the air guide is formed between the optical member 36 and the second reflector 32, central portions of the optical member 36 may sag. Therefore, the support pins 40 serve to prevent the central portion of the optical member 36 from sagging.

Here, the support pin 40 may be configured such that the area of the lower surface of the support pin 40 contacting the second reflector 32 is greater than the area of the upper surface of the support pin 40.

Further, circuit devices to drive the light source module 20 may be disposed under the inclined surfaces of the support part 34. A designated space is provided on the rear surface of the support part 34 between the inclined surfaces. Therefore, when the circuit devices are mounted in such a space, the vacant space may be effectively used.

Figure 10:
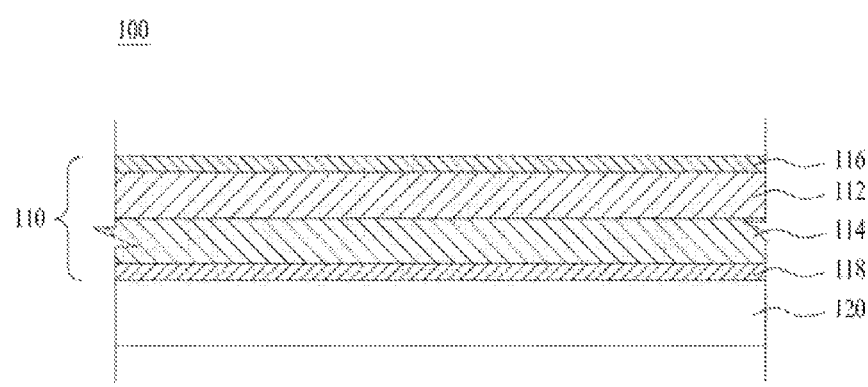
FIG. 10 is a cross-sectional view illustrating a display module having a backlight unit in accordance with one embodiment.

FIG. 10 is a cross-sectional view illustrating a display module having a backlight unit in accordance with one embodiment.

As shown in FIG. 10, a display module 100 may include a display panel 110 and a backlight unit 120.

The display panel 110 may include a color filter substrate 112 and a thin film transistor (TFT) substrate 114 disposed opposite each other and bonded to each other to maintain a uniform cell gap, and a liquid crystal layer (not shown) may be interposed between the two substrates 112 and 114.

Further, an upper polarizing plate 116 and a lower polarizing plate 118 may be disposed on the upper surface and the lower surface of the display panel 110, and more particularly, the upper polarizing plate 116 may be disposed on the upper surface of the color filter substrate 112 and the lower polarizing plate 118 may be disposed on the lower surface of the TFT substrate 114.

Although not shown in the drawings, gate and data driving units generating driving signals to drive the display panel 110 may be provided on the side surfaces of the display panel 110.

Figure 11:
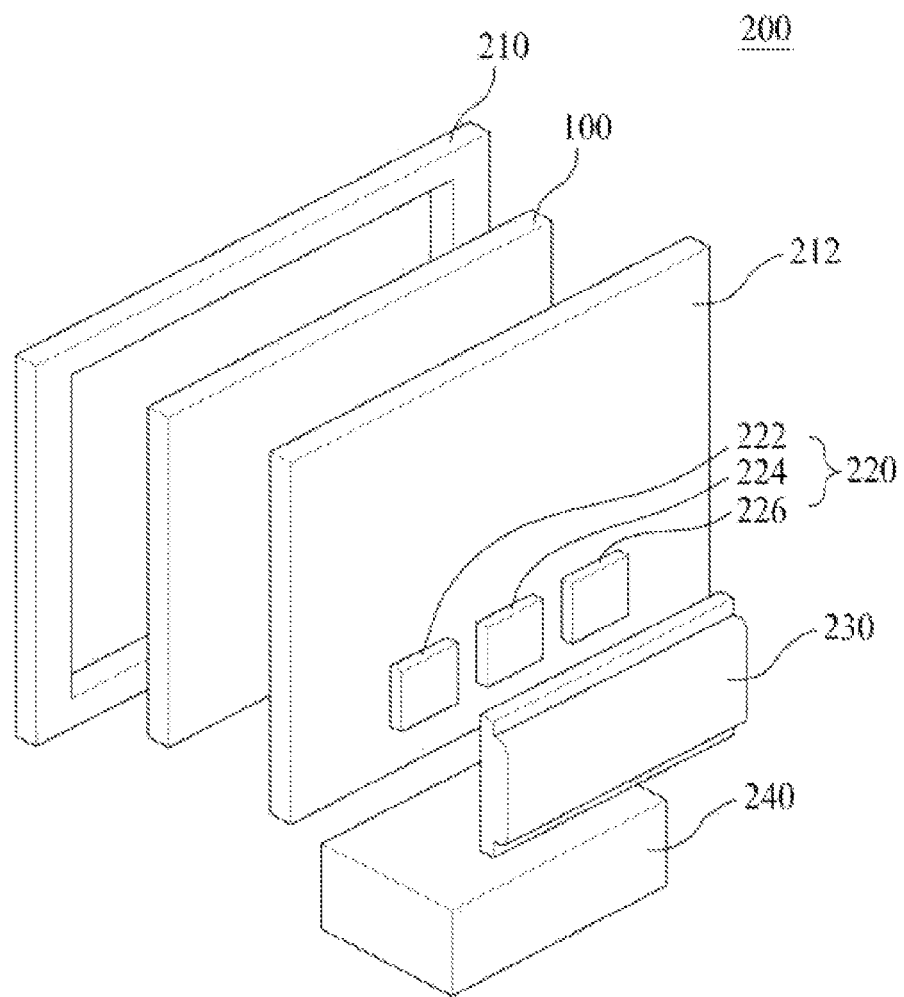
FIGS. 11 and 12 are views respectively illustrating displays in accordance with embodiments.
Figure 12:
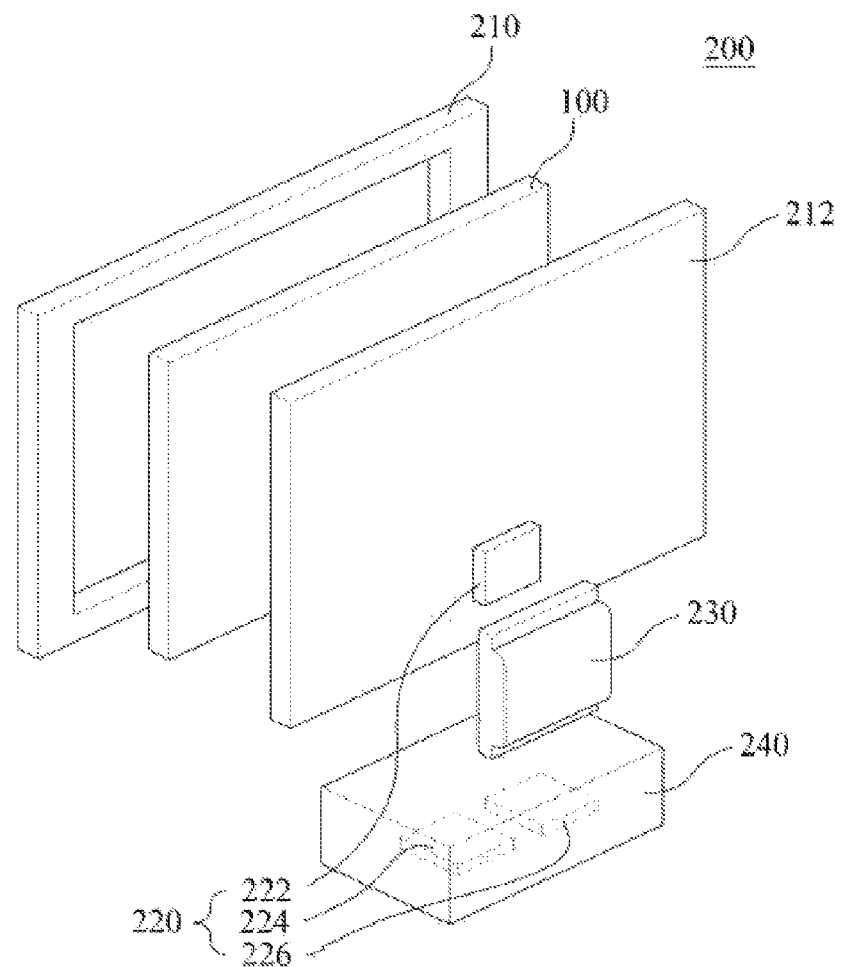

FIGS. 11 and 12 are views respectively illustrating displays in accordance with embodiments.

First, as shown in FIG. 11, a display 200 may include a display module 100, a front cover 210 and a back cover 212 surrounding the display module 100, a driving unit 220 provided on the back cover 212, and a driving unit cover 230 surrounding the driving unit 220.

The front cover 210 may include a front panel (not shown) formed of a transparent material transmitting light. The front panel which is separated from the display module 100 by a designated interval protects the display module 100 and transmits light emitted from the display module 100, thereby allowing an image displayed on the display module 100 to be seen from the outside.

The back cover 212 may be connected to the front cover 210 to protect the display module 100. The driving unit 220 may be disposed on one surface of the back cover 212. The driving unit 220 may include a driving control unit 222, a main board 224 and a power supply unit 226.

The driving control unit 222 may be a timing controller, i.e., a driver to control operation timing of respective driver ICs of the display module 100, the main board 224 may be a driver to transmit a V-sync, an H-sync and R, G and B resolution signals to the timing controller, and the power supply unit 226 may be a driver to apply power to the display module 100.

The driving unit 220 may be provided on the back cover 212 and be surrounded by the driving unit cover 230.

The back cover 212 may be provided with a plurality of holes through which the display module 100 and the driving unit 220 are connected to each other, and a stand 240 to support the display 200 may be provided.

On the other hand, as shown in FIG. 12, the driving control unit 222 of the driving unit 220 may be provided on the back cover 212, and the main board 224 and the power supply unit 226 of the driving unit 220 may be provided on the stand 240.

Further, the driving unit cover 230 may surround only the driving control unit 220 provided on the back cover 212.

Although the embodiments describe the main board 224 and the power supply unit 226 as being separately provided, the main board 224 and the power supply unit 226 may be integrated into one board.

As is apparent from the above description, a backlight unit and a display using the same in accordance with one embodiment provide a gap through which a yellow-white component of light emitted from light sources leaks, thereby reducing yellowing of light emitted from the backlight unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light source, comprising:
    a cover;
    at least two light source modules fixed to the cover and facing each other in a first direction, each of the at least two light source modules including a circuit board and a light emitting device; and
    a reflective body disposed between the at least two light source modules, the reflective body including at least two inclined surfaces having at least one inflection point, and curvatures of the at least two inclined surfaces being connected to the inflection point,
    wherein a distance in the first direction between a top surface of the light emitting device of one of the two light source modules and an end of the reflective body closest to the top surface of the light emitting device of one of the two light source module is from 0.1 mm to 1.2 mm,
    wherein the top surface of the light emitting device of one of two light source modules is away from a hypothetical space extending from a top surface of the reflective body in a second direction perpendicular to the first direction, and wherein the reflective body has an enlarged width portion protruding toward the circuit board between neighboring two light emitting devices in a third direction perpendicular to the first and second directions.

2. The light source according to claim 1, wherein a shortest distance between the circuit board and the enlarged width portion facing each other is same as a thickness of the light emitting device.

3. The light source according to claim 1, wherein a shortest distance between the circuit board and the enlarged width portion facing each other is larger than a thickness of the light emitting device.

4. The light source according to claim 1, wherein the enlarged width portion has at least one shape from among a hemispherical shape, a triangular shape, a rectangular shape and a polygonal shape.

5. The light source according to claim 1, wherein the enlarged width portion includes a tapered edge.

6. The light source according to claim 5, wherein the tapered edge includes an apex facing the circuit board.

7. The light source according to claim 6, wherein a shortest distance between the circuit board and the apex facing each other is same as a thickness of the light emitting device.

8. The light source according to claim 1, wherein the enlarged width portion includes a rounded edge.

9. The light source according to claim 8, wherein a shortest distance between the rounded edge and the circuit board facing each other is larger than a thickness of the light emitting device.

10. The light source according to claim 1, wherein an angle of inclination of an upper surface of the reflective body is 5° to 15°.

11. The light source according to claim 1, further comprising a support part supporting the reflective body.

12. The light source according to claim 11, further comprising reinforcing ribs disposed on a rear surface of the support part.

13. The light source according to claim 1, wherein the reflective body has bilateral symmetric shape along the third direction.

14. A light source, comprising:

a cover including first and second cover plates facing each other in a first direction, each of the first and second cover plates having a first part and a second part connected to the first part in a substantially perpendicular direction;

a first light source module on the first part of the first cover plate, the first light source module including a first circuit board and a first light emitting device;

a second light source module on the first part of the second cover plate, the second light source module including a second circuit board and a second light emitting device;

a reflective body disposed between the first cover plate and the second cover plate, wherein the first light emitting device of the first light source module is away from a first end of the reflective body closest to the first light emitting device, wherein the second light emitting device of the second light source module is away from a second end of the reflective body closest to the second light emitting device, wherein the first end of the reflective body closest to the first light emitting device of the first light source module is positioned between the first light emitting device and a third end of the second part of the first cover plate farthermost from the first light emitting device, in the first direction, and wherein the second end of the reflective body closest to the second light emitting device of the second light source module is positioned between the second light emitting device and a fourth end of the second part of the second cover plate farthermost from the second light emitting device, in a direction parallel to the first direction.

15. The light source according to claim 14, wherein the first light emitting device of the first light source module is away from the first end of the reflective body closest to the first light emitting device in at least one of the first direction or a second direction, the second direction being perpendicular to the first direction, and wherein the second light emitting device of the second light source module is away from the second end of the reflective body closest to the second light emitting device in at least one of the first direction or the second direction.

16. The light source according to claim 14, wherein the first light emitting device of the first light source module is away from the first end of the reflective body with a distance from 0.1 mm to 1.2 mm, and wherein the second light emitting device of the second light source module is away from the second end of the reflective body with a distance from 0.1 mm to 1.2 mm.

17. A display, comprising:

a display panel; and a light source unit irradiating light onto the display panel, wherein the light source unit, comprising:

a cover;

at least two light source modules fixed to the cover and facing each other in a first direction, each of the at least two light source modules including a circuit board and a light emitting device; and a reflective body disposed between the at least two light source modules, the reflective body including at least two inclined surfaces having at least one inflection point, and curvatures of the at least two inclined surfaces being connected to the inflection point, wherein a distance in the first direction between a top surface of the light emitting device of one of the two light source modules and an end of the reflective body closest to the top surface of the light emitting device of one of the two light source module is from 0.1 mm to 1.2 mm, wherein the top surface of the light emitting device of one of two light source modules is away from a hypothetical space extending from a top surface of the reflective body in a second direction perpendicular to the first direction, and wherein the reflective body has an enlarged width portion protruding toward the circuit board between neighboring two light emitting devices in a third direction perpendicular to the first and second directions.

* * * * *